J. M. CANFIELD.
BEVERAGE DISPENSING APPARATUS.
APPLICATION FILED OCT. 25, 1919.
1,363,084.   Patented Dec. 21, 1920.
2 SHEETS—SHEET 1.
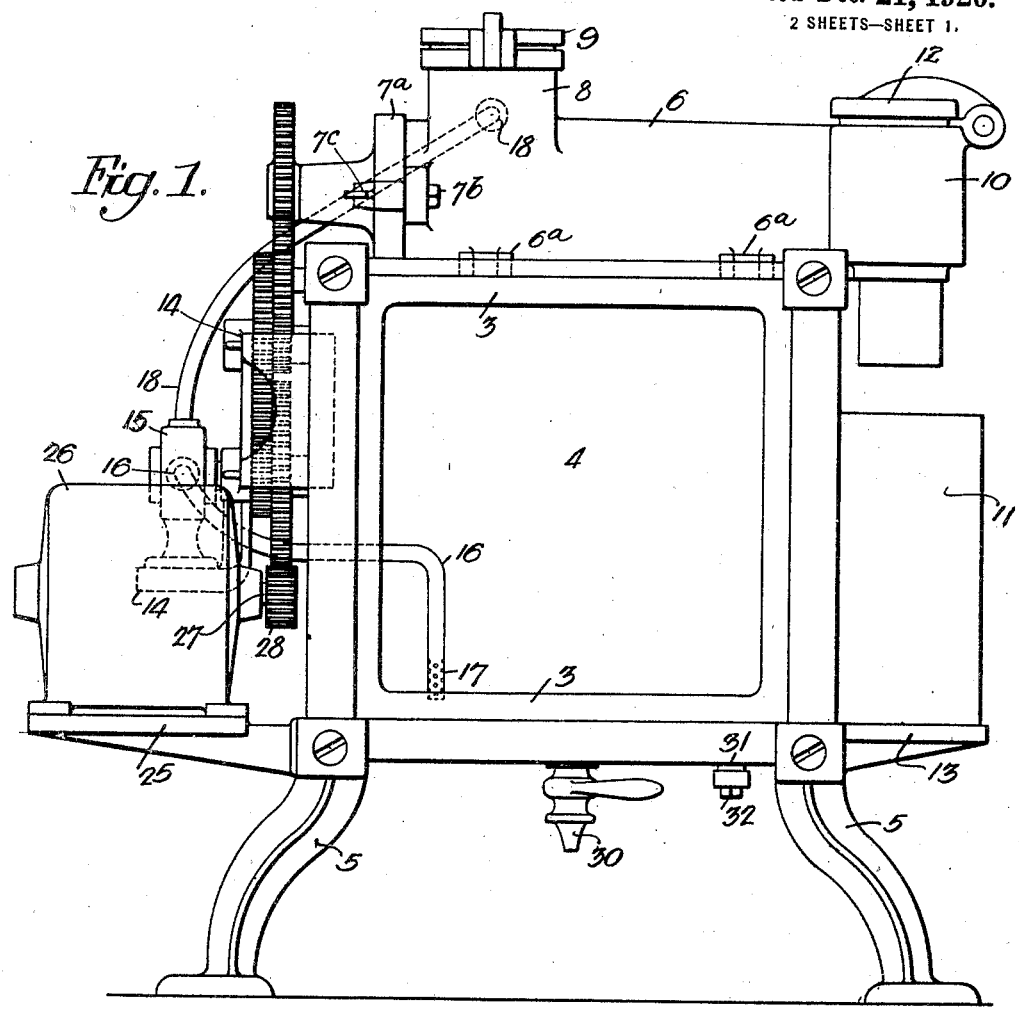
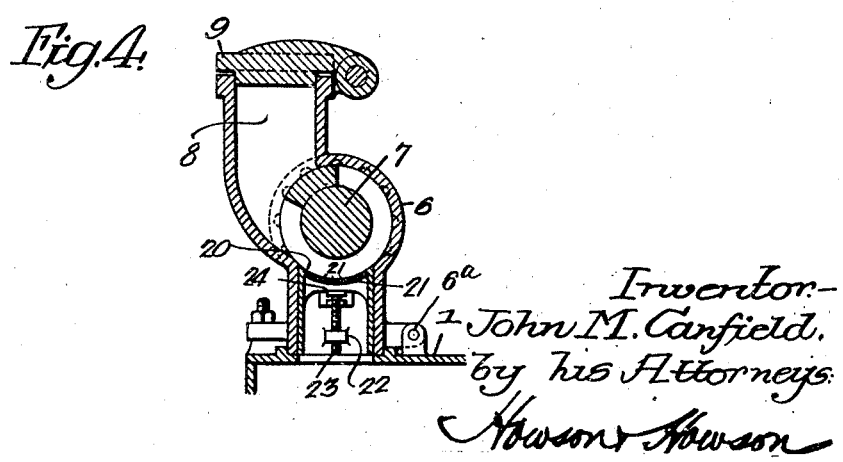
Inventor
John M. Canfield
by his Attorneys
Howson & Howson

J. M. CANFIELD.
BEVERAGE DISPENSING APPARATUS.
APPLICATION FILED OCT. 25, 1919.

1,363,084.

Patented Dec. 21, 1920.
2 SHEETS—SHEET 2.

Inventor-
John M. Canfield.
by his Attorneys
Howson Howson

UNITED STATES PATENT OFFICE.

JOHN M. CANFIELD, OF NORTH GLENSIDE, PENNSYLVANIA.

BEVERAGE-DISPENSING APPARATUS.

1,363,084.  Specification of Letters Patent.  Patented Dec. 21, 1920.

Application filed October 25, 1919. Serial No. 333,217.

*To all whom it may concern:*

Be it known that I, JOHN M. CANFIELD, a citizen of the United States, residing in North Glenside, Montgomery county, Pennsylvania, have invented certain Improvements in Beverage-Dispensing Apparatus, of which the following is a specification.

My invention relates to apparatus for dispensing liquids, and includes means for preparing part of or one of the ingredients of the liquid dispensed.

One object of my invention is to provide a structure adapted to dispense a beverage made up largely of water, orange juice and sugar, and to provide means whereby the taste and flavor of such beverage can be augmented by crushing oranges which preferably have been previously cut into sections of suitable size; the crushing operation having the effect of squeezing the rind or skin of the orange whereby the oil contained in such skin or rind is expressed and is mingled with the orange juice and the other liquid or liquids and ingredients employed in the preparation of the beverage.

A further object of my invention is to provide for introducing a portion of the liquid forming part of the beverage in course of preparation in contact with the juice of the orange at the squeezing point of the same so that such liquid can be employed to wash the squeezing means, preferably a rotating screw, to keep it clear of the pulp, juice and oil of the orange; all of which liquid and material is returned to the main tank or reservoir from which the beverage is dispensed.

A further object of my invention is to provide a self-contained structure, with which a small motor or other prime mover can be combined and supported, whereby the screw or other crushing or other squeezing means can be driven to press, crush, or squeeze the fruit and the skin or rind thereof simultaneously with the operation of the pump to flood the chamber of the squeezing or crushing means while the operation of expressing the juice and oil is going on.

The structure forming the subject of my invention is well adapted to be placed upon the counter of a drug store or other establishment dispensing beverages, and the operation is under ready control so that squeezing of the fruit to produce, in combination with the liquids and ingredients employed, the desired beverage can proceed at any time; dispensing of the prepared beverage taking place independently of the preparation of the same, or simultaneously therewith, as desired.

These and other features of my invention are more fully described hereinafter, reference being had to the accompanying drawings, in which:

Figure 1, is a side elevation of a beverage making and dispensing apparatus constructed in accordance with my invention.

Fig. 4, is a cross sectional view illustrating certain details of my invention.

Figure 2:
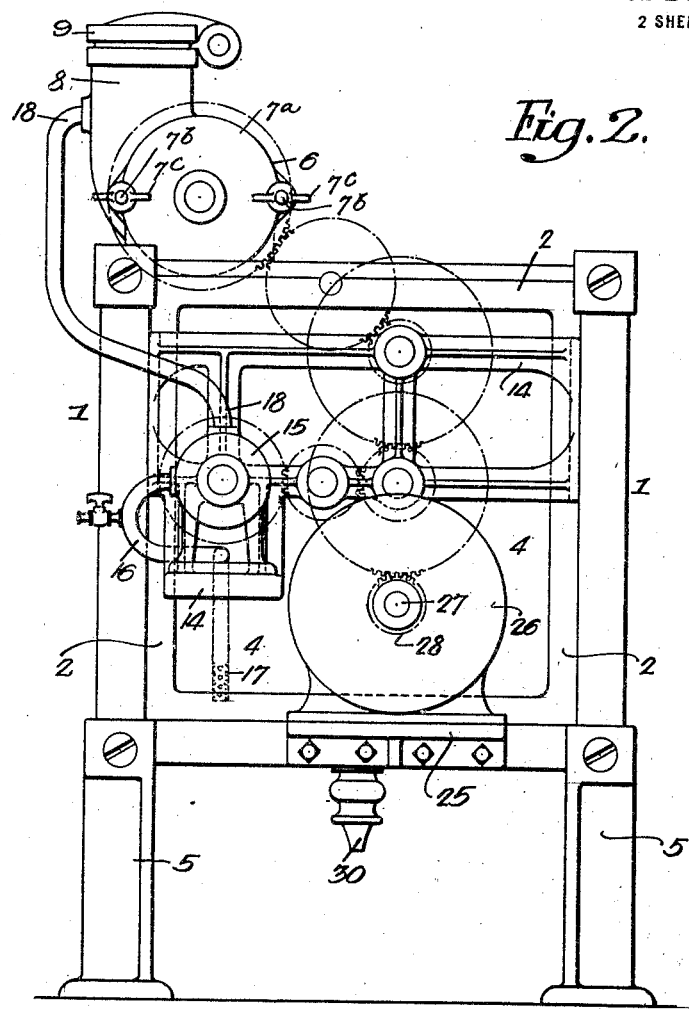
Fig. 2, is a front elevation of the same.
Figure 3:
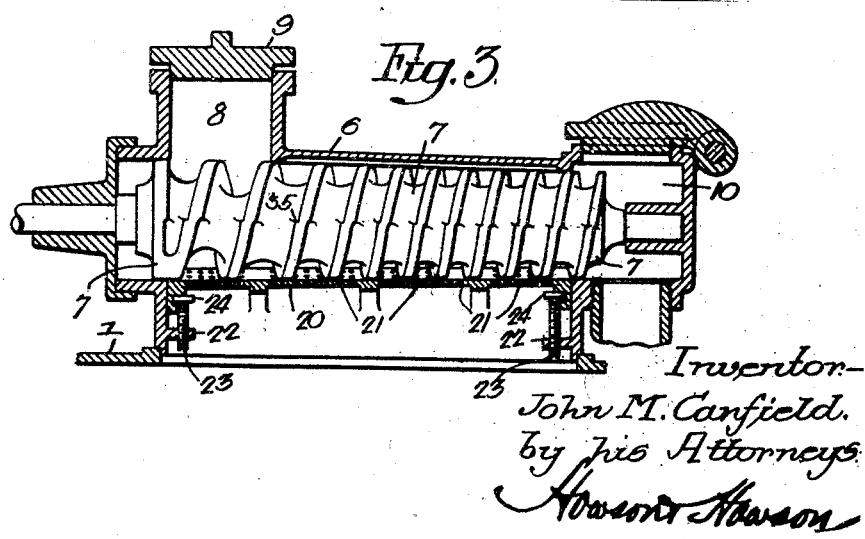
Fig. 3, is an enlarged sectional view of one form of crushing structure which I may employ, including a casing, screw and a straining device.

In the drawings herewith, 1 represents a suitable tank or receptacle, which may be made up of end plates 2 preferably slotted, and side frames 3 in which sections of plate glass 4 may be placed in order that the contents of the receptacle or tank may be viewed by the operator, who is thus kept advised of the supply, and also by the intending purchaser. This receptacle or tank may be mounted upon a series of legs or supports 5, and it may constitute a supply from which the beverage may be drawn as desired, or the beverage delivered to this receptacle and which has been circulated by the pump in the manner hereinafter described in cleansing the chamber in which the fruit is squeezed or crushed, may be drawn off and placed in another receptacle (not shown) for storage and subsequent use.

At the top of the tank, I provide squeezing or crushing means for the oranges or other fruit, and such squeezing or crushing means may include a casing 6 for the reception of a screw 7; said casing having a hopper 8 into which fresh fruit, usually oranges, cut into sections of proper size may be introduced, with a cover 9 closing the same so that no juice will be thrown out during the squeezing operation.

The end of the casing is preferably provided with a discharge hopper 10, which may lead to a removable receptacle 11 adapted to receive the squeezed orange skins with the accompanying pulp and seeds. The discharge hopper is preferably provided with a cover 12, and the refuse receptacle may be carried by a shelf 13 supported by the frame, and this is preferably disposed at the rear of the machine.

At the front of the machine, I may provide a bracket support 14, for a pump 15, having an inlet pipe 16 with a perforated suction end 17 disposed within the tank or receptacle, and a discharge pipe 18 leading to the hopper receiving the fresh fruit so that as the latter is squeezed, the incoming liquid pumped through said pipe 18 will tend to wash the interior of the casing, and the screw, when such form of crushing or squeezing means are used, and insure discharge of all the material into the tank or receiver, with the oils expressed from the skin or rind.

To prevent the seeds entering the tank or receptacle, I preferably provide a strainer plate 20 in the bottom of the casing receiving the screw; such plate having a large number of small perforations 21, and this strainer plate is removable for cleaning purposes; being preferably cleaned at least daily after the day's operations have been completed, making it ready for the succeeding day. The strainer plate is preferably adjustably mounted so as to take care of any wear by the screw. For this purpose, the casing may have lugs 22 for the reception of screws 23, having heads 24 whereby the strainer plate may be positively moved in either direction with reference to the screw, or removed entirely by backing off said screws. It will be understood, of course, that any other suitable means for securing the strainer in position may be employed, and that in some instances the strainer portion may be integral with the lower portion of the screw casing.

The screw casing may be hinged to the top of the main casing as indicated at 6ª, being held down on the opposite side by suitable wing nuts in engagement with stud bolts or the like. In lieu of this arrangement I may provide stud bolts on both sides of the same with which slotted lugs on the casing are adapted to engage, with wing nuts engaging said slotted lugs, and dispose the structure so that this casing may be lifted entirely clear of the main casing. Such arrangement is intended to permit examination and cleaning of the screw and adjustment and cleaning of the straining plate. The front end of the screw casing includes a cap 7ª which may be held in place by bolts 7ᵇ and wing nuts 7ᶜ. By removing these parts, the screw can be removed from the casing for any purpose desired.

Supported by a suitable bracket or shelf 25 carried by the frame is a motor 26, to the shaft 27 of which a pinion 28 is attached, and this pinion serves to drive, through suitable trains of gears as shown, the screw and the pump; the operation of which is simultaneous so that a portion of the liquid beverage is being introduced into the screw chamber as the fruit therein is being crushed.

The liquid or beverage is preferably drawn off from the tank or receptacle through a faucet 30 at the bottom of the same, which may be of any usual type, and additionally the tank or receptacle may be provided with a cleaning outlet 31 normally closed by a cap or plug 32.

In order to effect proper squeezing action upon the rind or skin of the oranges or other fruit, a highly desirable matter in connection with my improved structure, the thread of the screw is offset as indicated at 35; such offset portions causing the said thread to pinch the skin or rind and break up the oil cells of the same.

While I have shown the circulating liquid as delivering to the hopper at the feed end of the machine, it will be understood that such liquid may be delivered at any suitable point of the supplemental casing to insure proper washing or cleaning of the screw, casing and strainer.

I claim:

1. In an apparatus for making beverages, the combination of a casing forming a liquid receptacle, a supplemental casing mounted above the main casing, a compressing screw having a shouldered thread in said supplemental casing; said supplemental casing adapted to receive fruit, a straining screen forming the bottom of the supplemental casing below the screw, and means for adjusting said screen toward and from the screw.

2. In an apparatus for making beverages, the combination with a casing forming a liquid receptacle, and having means for drawing off the liquid therefrom, of a supplemental casing mounted above the main casing, a compressing screw in said supplemental casing, said supplemental casing being adapted to receive fruit, a straining screen forming the bottom of the supplemental casing below the screw, and means for causing a circulation of liquid from the main casing through the said supplemental casing.

3. In an apparatus for making beverages, the combination of a casing forming a liquid receptacle, a supplemental casing mounted above the main casing, a compressing screw in said supplemental casing, said supplemental casing being adapted to receive fruit, a straining screen forming the bottom of the supplemental casing below the screw, a pipe line extending from the main casing to the supplemental casing, and a pump in said pipe line adapted to force liquid from the main casing to the supplemental casing.

4. In an apparatus for making beverages, the combination of a casing forming a liquid receptacle, of a supplemental casing mounted above the main casing and adapted to receive fruit, a compressing screw in said supplemental casing, a straining screen forming the bottom of the supplemental casing below the screw, means for rotating the said compressing screw, a pipe line leading from the main casing to the supplemental casing, and a pump for forcing liquid through said pipe line from the main casing to the supplemental casing.

5. In an apparatus for making beverages, the combination of a casing forming a receptacle for the beverage, a supplemental casing mounted above the main casing and hinged thereto, a compressing screw in said supplemental casing, said supplemental casing being adapted to receive fruit, a removable straining screen forming the bottom of the supplemental casing below the screw, means for rotating the screw in its casing, and means for carrying liquid from the receptacle and discharging it into the screened casing.

6. In an apparatus for making beverages, the combination of a casing forming a receptacle for the beverage, a supplemental casing mounted above the main casing, a compressing screw in said supplemental casing, said supplemental casing being adapted to receive fruit, means for revolving the screw in said casing, a removable straining screen forming the bottom of the supplemental casing below the screw, a pulp receiver at the end of the screw casing, a pipe line extending between the receptacle and the screw casing, and a pump for forcing liquid through the pipe line from the receptacle into the screw casing, said pump and screw rotating means being operably interconnected for obtaining a flow of liquid from the receptacle to the screw casing in direct proportion to the speed of rotation of said screw.

7. In a machine for preparing beverages, the combination with a liquid receptacle, of a squeezing chamber for fresh fruit, a screw operating in said squeezing chamber, and means for circulating the liquid between the liquid receptacle and the squeezing chamber while the said screw is in operation.

JOHN M. CANFIELD.